US005911849A

United States Patent [19]

Bradshaw et al.

[11] Patent Number: 5,911,849

[45] Date of Patent: Jun. 15, 1999

[54] LUBRICATING AND WIPING SYSTEM FOR LINERLESS LABEL SYSTEM

[75] Inventors: Franklin C. Bradshaw, Scottsdale; Michael W. Paque, Cave Creek; Anthony S. Moran, Phoenix, all of Ariz.

[73] Assignee: Boss Systems, Inc., Scottsdale, Ariz.

[21] Appl. No.: 09/070,396

[22] Filed: Apr. 30, 1998

[51] Int. Cl.$^6$ .............................. B32B 31/00; B26D 7/08; B05C 1/00

[52] U.S. Cl. .......................... 156/261; 156/264; 156/521; 83/168; 118/243; 118/264

[58] Field of Search ..................................... 156/261, 264, 156/521; 83/168, 169, 922; 118/243, 263, 256, 264

[56] References Cited

U.S. PATENT DOCUMENTS

| | | | |
|---|---|---|---|
| 527,009 | 10/1894 | Bazerque | 118/243 |
| 2,843,670 | 7/1958 | Hell et al. | 118/243 |
| 4,288,280 | 9/1981 | Morin | 156/510 |
| 4,978,415 | 12/1990 | Jones | 156/517 |
| 5,431,763 | 7/1995 | Bradshaw | 156/256 |

*Primary Examiner*—David A. Simmons
*Assistant Examiner*—Sue A. Purvis
*Attorney, Agent, or Firm*—Gregory J. Nelson

[57] ABSTRACT

A linerless label system which utilizes a substrate provided in roll form and which is printed on one side with an image overcoated with an adhesive. The opposite surface of the substrate has release characteristics. The web is fed across the surface of an anvil plate. A die engages the anvil plate, cuts the label from the web which label is then transferred to the surface of an item to be labeled, such as a plastic container. Intermittently, a wiper blade sweeps across the surface of the die to prevent the labels from sticking to the die edge. Preferably, the wiper blade carries a lubricant such as a silicon-based grease.

10 Claims, 5 Drawing Sheets

LUBRICATING AND WIPING SYSTEM FOR LINERLESS LABEL SYSTEM

FIELD OF THE INVENTION

The present invention relates to a linerless label system and more particularly relates to a system in which a substrate such as paper, polyester film, or polypropylene film is printed with an image forming a printed web and the web is thereafter transferred to an applicator. At the applicator, the pre-printed web is fed past a die which severs a portion of the web defining a label. The label is then transferred directly to an article such as a packaging container or the like.

BACKGROUND OF THE INVENTION

The general field of labeling in which a label is provided without a backing is generally termed the field of "linerless labels". In linerless label systems, a substrate such as plastic film is repeatedly printed with the label image on one side and coated with an adhesive on the other side. The substrate, usually in roll form, is fed through an applicator which severs and applies the labels directly to the surface of a container such as a milk container, oil container or the like. Various systems can be found in the prior art in which the printed substrate is coated with all adhesive on one side and is provided in roll form which eliminates the need for a backing.

U.S. Pat. No. 5,431,763 discloses a linerless label system which utilizes a transparent paper or plastic film substrate. The substrate is provided in web roll form and is printed on one side with an image which is overcoated with an adhesive. The opposite surface has release characteristics. When applied, the web is fed across the surface of an anvil plate. A die engages the anvil plate and cuts the label from the web, which label is then transferred to the surface of an item such as a plastic container.

The applicator equipment described in the '763 patent includes an unwind shaft on which the roll is mounted. The web is fed across the anvil plate which defines an aperture which receives a reciprocal transfer member. The transfer member has a recess which contains a porous perforated surface or material such as a sponge. The transfer member is operatively connected to a plunger or actuator and the interior of the member communicates with a low vacuum source. An oppositely disposed cooperating clamp plate receives an interchangeable die such as a steel rule or machined die which cooperates with the anvil plate to sever the label when the two are brought into engagement. The web is pre-marked with locator or registration marks which are sensed by an optical reader or other sensor. The applicator unit is positioned adjacent a conveyor line along which the articles to be labeled move. A typical application is the labeling of plastic milk bottles. A microswitch or other sensor senses the presence of an article aligned with the applicator unit. The optical reader or other sensor senses the registration marks and causes the clamping plate to retract bringing the die against the substrate and the anvil plate at the proper location. The die cuts the label from the web and the transfer member extends to transport the severed label which is held in place on the transfer member by a vacuum. The adhesive on the label surface adjacent the article secures the label to the article and the vacuum is then released allowing the transfer member to return to a retracted position so the next printed label on the web may be advanced. If the substrate is transparent, the image is preferably on the surface of the substrate which is applied to the container, protecting it from moisture, chemicals or other damaging environmental elements which may be present. The die being a steel rule or machined die is of simple construction and may easily be changed in accordance with the requirements of the label configuration.

The system described above works well and has been commercially accepted. However, in some instances, it is possible, particularly over prolonged uses, for adhesives to accumulate on the die surface which will impair the operation of the unit by impeding the retraction of the die from the web or impair the transfer of the severed label to the article.

BRIEF SUMMARY OF THE INVENTION

Accordingly, the present invention represents an improvement to U.S. Pat. No. 5,431,763 and provides a wiper mechanism which periodically passes across the knife edge of the die to wipe the die surface and simultaneously apply a lubricant such as a silicon paste to the knife edge of the die to prevent sticking of the web and sticking of the severed label.

The wiper includes a wiper arm which is rotatably or transversely mounted adjacent the die plate. The wiper arm has a receptive surface which may be a brush-like applicator pad which will engage the knife edge of the die in the actuated position. In the retracted position, the wiper is positioned in an out-of-the-way position so as to not interfere with the operation of the die. In the out-of-the-way position, the applicator pad engages a reservoir of lubricant which may be a porous or fibrous pad saturated with a silicon grease. The wiper may be periodically actuated by an electrical, hydraulic motor or mechanical linkage which will cause it to rotate into a position so that it passes across the surface of the die.

BRIEF DESCRIPTION OF THE DRAWINGS

The above and other objects and advantages, along with a more complete understanding of the present invention, will be had from the following description and claims, taken in conjunction with the accompanying drawings in which:

DETAILED DESCRIPTION OF THE DRAWINGS

Figure 1:
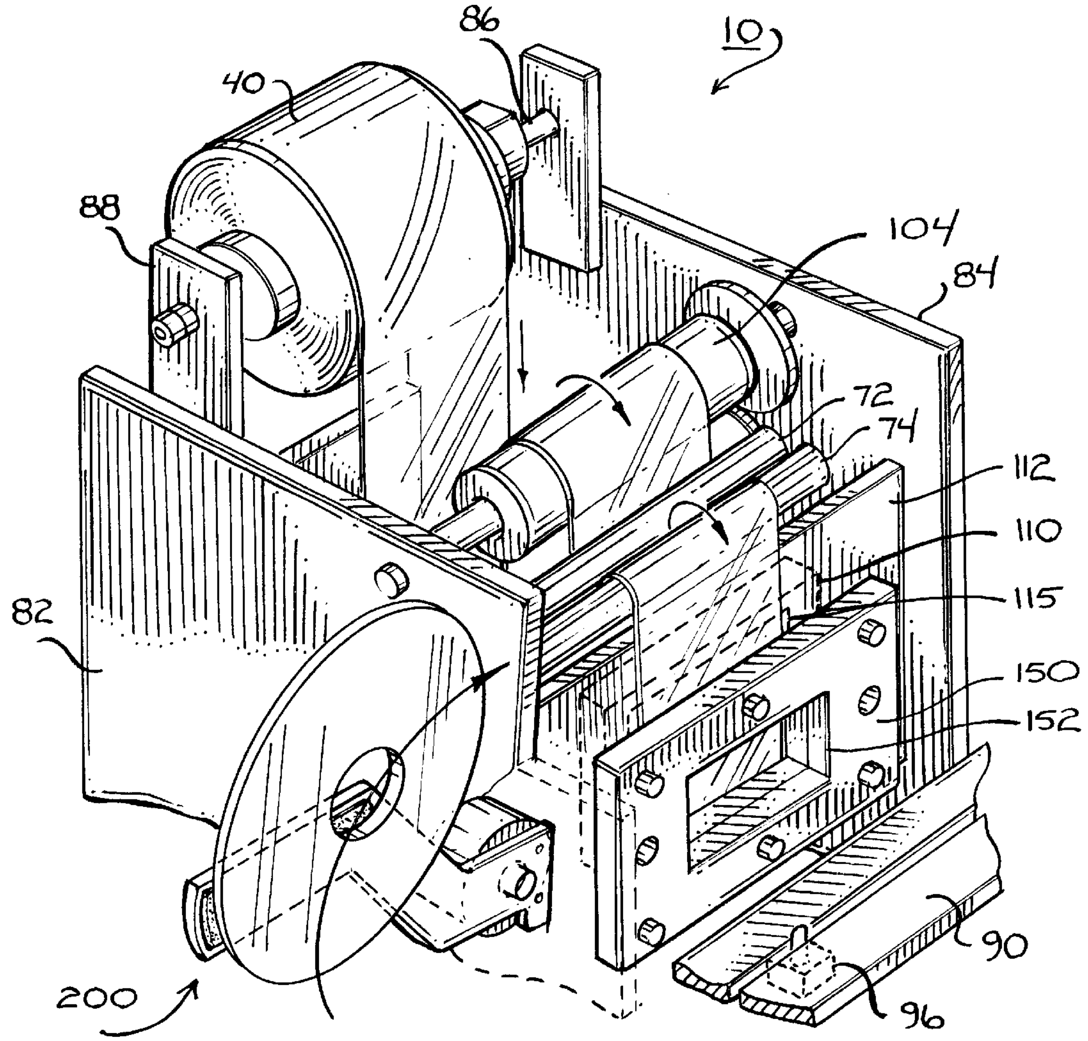
FIG. 1 is a perspective view of the applicator machine.

For purposes of conisistency throughout the specification, the term "substrate" is used to describe the film base material to which printed images, adhesives and coatings are applied. The term "web" or "web material" is used to describe the substrate material which has been printed, and coated with an adhesive and a release agent. The web material is generally provided in roll form for application. The invention described herein is applicable to the labeling of articles of various types including packaging containers, but for purpose of description, reference will be made to labeling containers such as plastic milk bottles and similar liquid containers which are intended to be exemplary of use of the system.

Preparation of labels in rolled web form can be accomplished by various means but preferably a roll of web stock material is prepared in accordance with the teachings of U.S. Pat. No. 5,431,763 which patent is incorporated herein by reference.

The applicator unit of the present invention serves to sever a label from the web roll and apply it to a container. The label may be of various types and since the web roll is preprinted and has an adhesive on one side and does not have a backing, the system is a linerless label system.

Turning to the drawings, the applicator unit 10 includes a frame which has opposite side walls 82 and 84. An unwind shaft 86 extends transversely between the side walls and is supported at its opposite ends at bearing plates 88. A web 40 of label stock which has been previously printed and prepared is mounted on the shaft 86. The containers to which labels are to be applied are indicated by the numeral 100 and for purposes of representation are shown as polyethylene milk containers. The containers are advanced to the application station by a conveyor 90 on which is located a sensor such as a microswitch 96. Since the sensor 96 identifies the presence of a container and actuates the applicator when the container is properly located on the conveyor with respect to the applicator unit 10. After labeling, labeled containers are advanced and a new container to be labeled is moved into position adjacent the applicator as more fully explained in U.S. Pat. No. 5,431,763.

The web extends over a feed roller 104 and between first and second guide rollers 72 and 74 which rollers extend transversely between the side walls of the applicator aligned with the anvil plate 110. A conventional unwind unit, not shown, serves to draw the web 41 from the web roll 40 along the path described above. Suitable tensioning devices to maintain proper tenision on the feed stock may be incorporated and a description of these is not believed necessary to an understanding of the invention as these devices are well known in the art.

Anvil plate 110 is mounted on support plate 112 which support plate extends transversely between the side walls of the applicator unit. The anvil plate 110 defines an opening 115 which receives the transfer member 120. Preferably, the lateral dimension of the opening 115 in the anvil plate is less than the size of the labels so that the severed label may be supported on the transfer member during the application operation.

Figure 3:
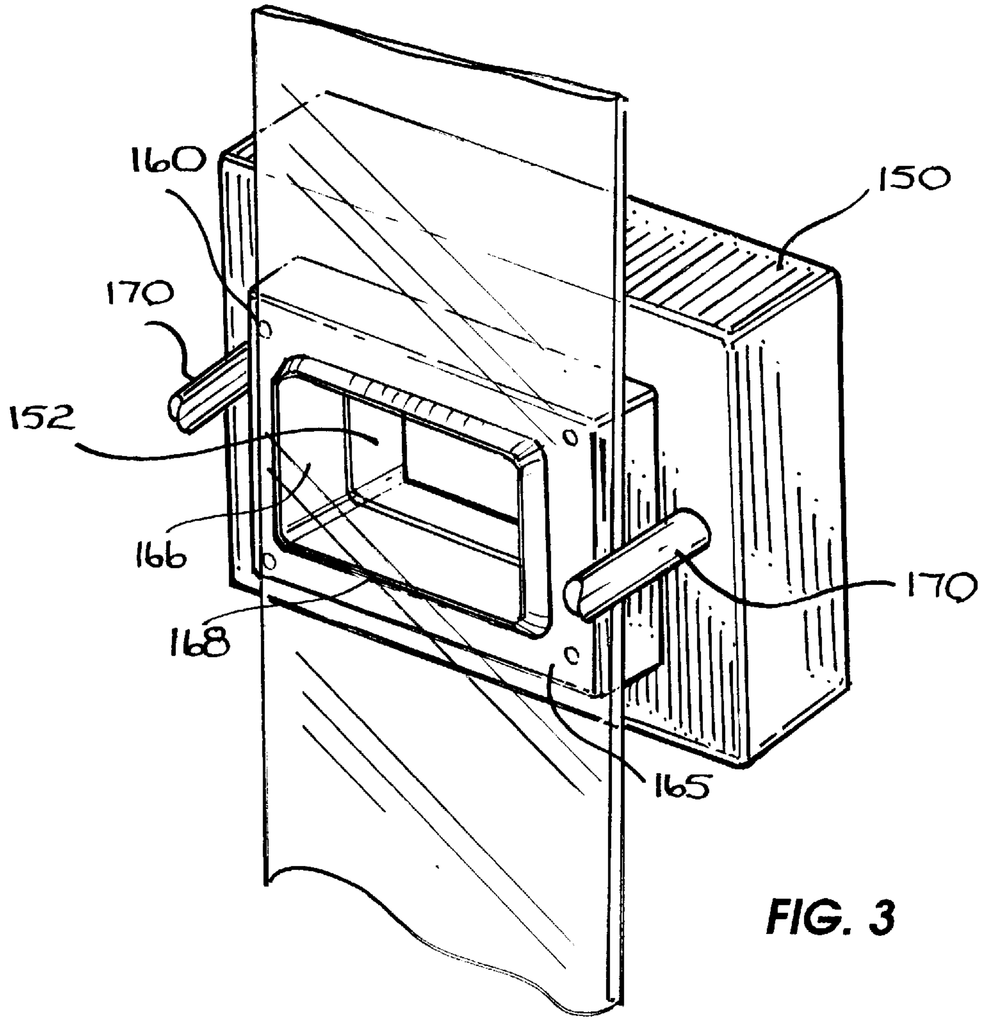
FIG. 3 is a perspective view of the die and clamping plate.

The cutting of the label is accomplished by a die 165 as best seen in FIG. 3. Die 165 is shown as a steel rule die which has an exterior cutting edge 168 which is configured in the desired shape of the label to be applied to the container. The die may be any suitable material such as tool grade steel and is detachably secured to the clamping plate by screws 160 located on the inner side of the clamping plate 150. The die 165 defines a cavity 166 extending rearwardly from the cutting edge 168 of the die.

Clamping plate 150 is vertically disposed at a location spaced from the anvil plate 110. The clamping plate is shown as a rectangular steel block having a central opening or aperture 152 which is larger than the cavity 166 in the die. Threaded bores are located in the plate adjacent the aperture 152 and receive machine screws 160 which detachably secure the die to the inner side of the clamping plate. The opening 166 in the die is aligned with the opening 152 in the anvil plate 150. It will be apparent that the die 165 may be easily changed and may be replaced with a new die by removing the screws 160 and replacing the die 165 with another die having an opening 166 to provide a label in the desired shape or configuration.

The clamping plate 150 is supported on a pair of cylinder rods 170 each operably connected to a pneumatic or hydraulic cylinder 172 which by means of rods 170 move the clamping plate toward or away from the anvil plate 110. An optical sensor 180 is located above the plate and initiates the application sequence once the microswitch 96 has energized the application machine.

Figure 4:
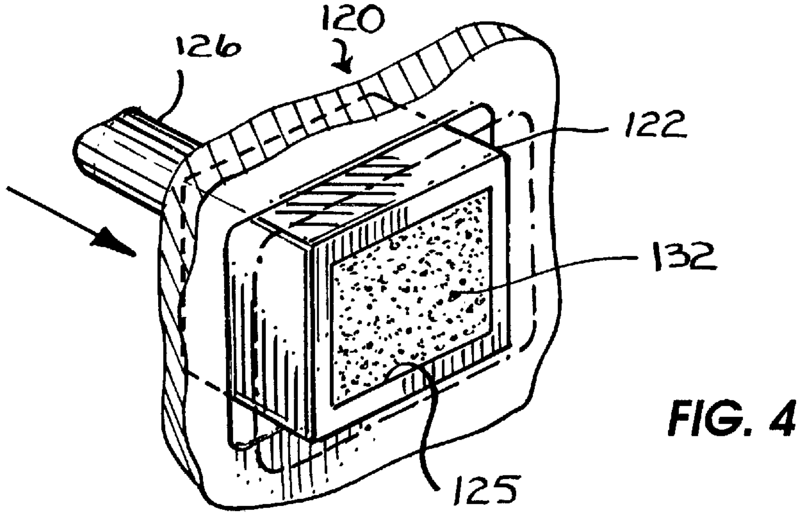
FIG. 4 is a perspective view of the transfer member.
Figure 5:
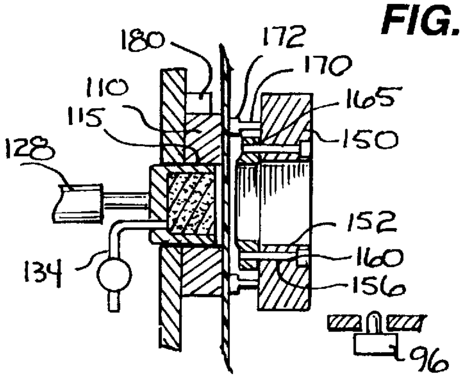
FIGS. 5 and 5A to 5G illustrate the sequence of operations carried out by the applicator in severing and applying a label to the article and of the wiper passing across the surface of the die during the operation.
Figure 5D:
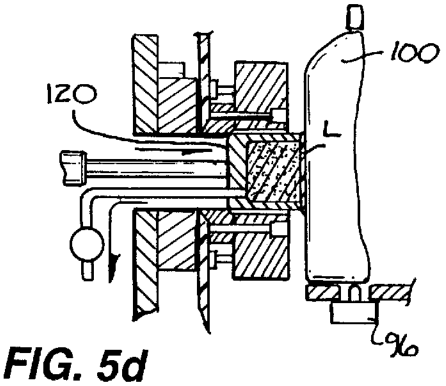
Figure 5A:
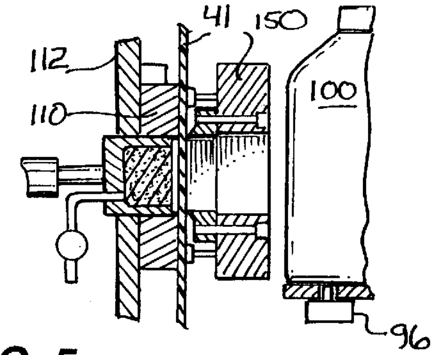
Figure 5E:
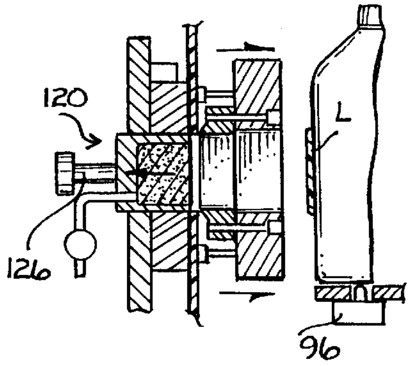
Figure 5B:
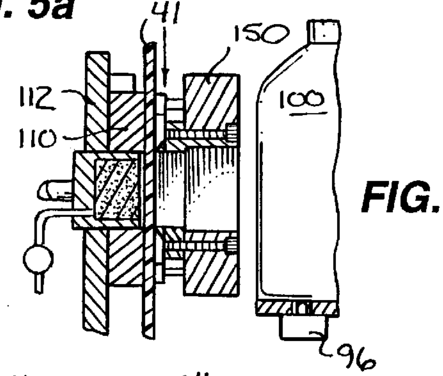
Figure 5F:
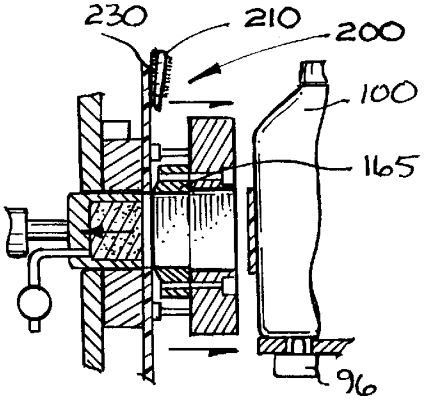
Figure 5C:
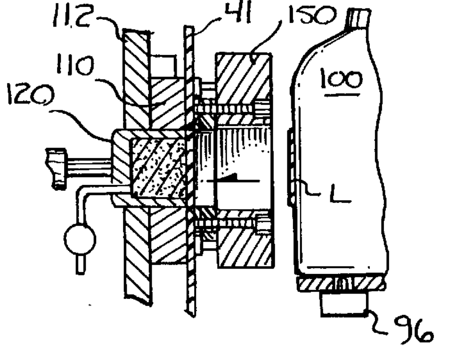
Figure 5G:
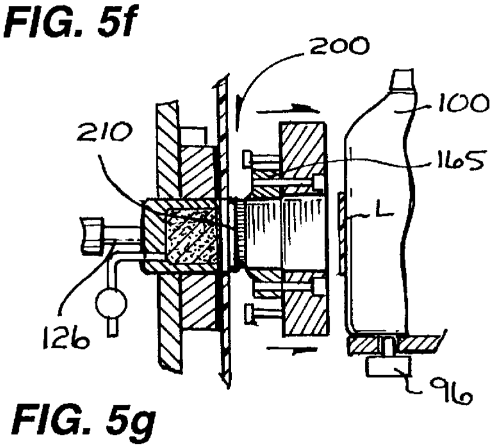

The transfer member 120, as shown in detail in FIG. 4, extends from the anvil plate and has a housing 122 defining an outwardly opening cavity 125. The housing 122 is selectively extendable and retractable by means of rod 126 of actuator 128. Cavity 125 is dimensioned so as to be smaller than the label to be applied. The cavity contains a sponge or other porous material 132 and is connectable to a low vacuum source via conduit 134 across valve 136 so that a low vacuum may be applied to the cavity and released as required to maintain the label "L" during transport and deposit the severed label on the container as shown in FIGS. 5 to 5G.

Figure 2:
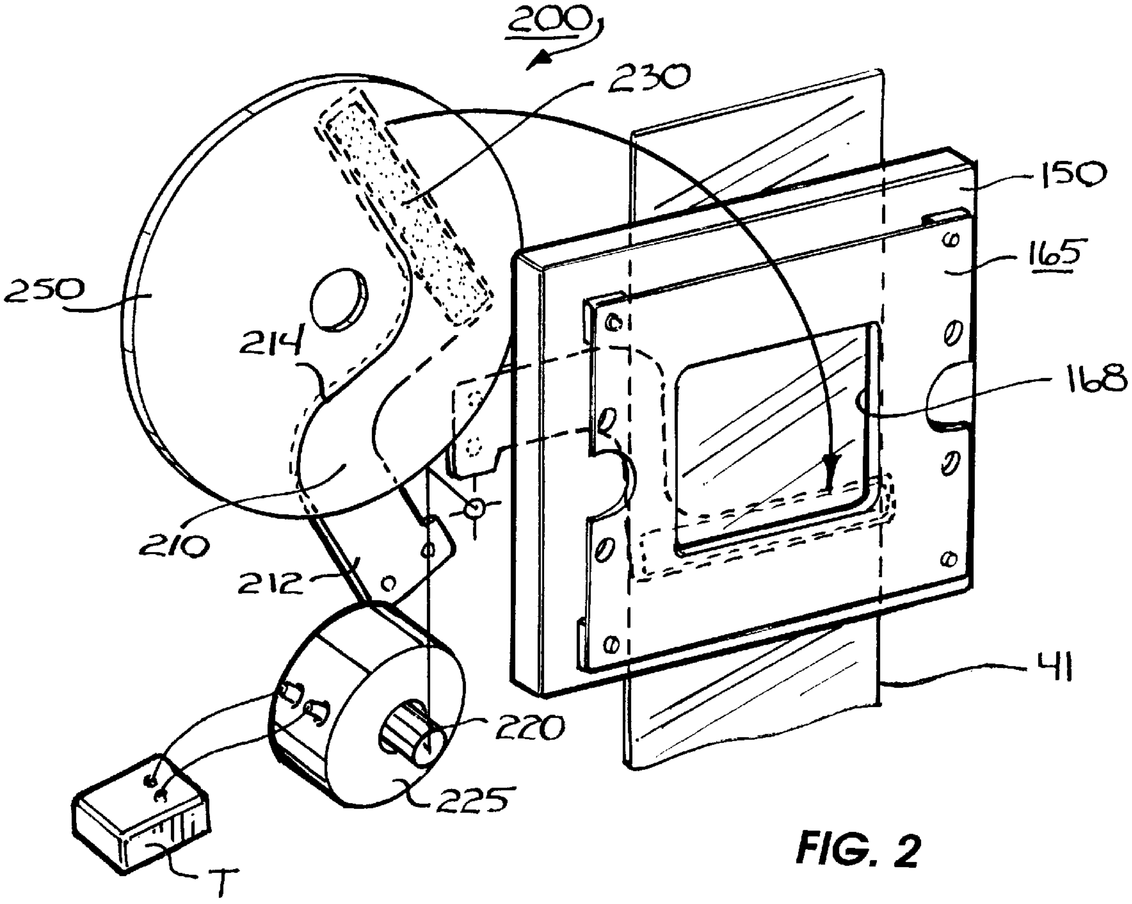
FIG. 2 is a view showing the wiper in the retracted position and showing the position of the wiper blade in the actuated position in dotted lines.

A wiper unit 200 is positioned laterally adjacent the die and is best seen in FIGS. 1 and 2. The wiper unit 200 has a wiper arm 210. The wiper arm 210 has a distal applicator end 216, an intermediate section 214 and inner end 212. The inner end 212 is mounted for rotation on output shaft 220 of motor 225. Motor 225 may be an electric motor operated by a timer "T" or may be a small rotary hydraulic actuator controlled by a valve which periodically causes the output shaft 220 to rotate. The output shaft will rotate approximately through a 120° arc so the applicator end 216, in the actuated position, passes lightly across the face of the die 165. In the fully actuated position, the arm 216 assumes a position generally aligned with the lower edge of die 165. As the wiper arm 210 retracts, it passes across the entire surface 168 to the fully retracted position shown in full lines in FIG. 2.

The wiper arm 216 is dimensioned and is positioned to accommodate various sizes and shapes of dies that may be secured to the clamping plate 150. The surface of the wiper arm disposed toward the die 165 is preferably covered with a pad 230 which has suitable cleaning characteristics and is an absorbent material which will pick up and transfer the lubricant to the die. A material such as a sponge or a brush like applicator material will work and the synthetic abrasive material commonly used on scrubbing pads such as that sold by 3-M under the designation SCOTCH BRITE works well for pad 230. Preferably the applicator pad 230 contains or carries a small amount of lubricant such as silicon grease as well as various oils and lubricants such as mineral and vegetable based oils will work.

In the retracted position, the applicator pad 230 contacts reservoir 250 which contains an amount of lubricant such as silicon grease. The reservoir 250 is shown as a pad of porous material similar to the material of the applicator pad and is saturated with the lubricant. Reservoir 250 may be any suitable shape. Periodically the operator can apply a different lubricant to the reservoir pad which is picked up and transferred to the applicator pad 230 as the applicator pad passes across the surface of the reservoir.

In operation, the unit 10 is positioned adjacent the conveyor 90 on which articles to be labeled are placed. The presence of an article 100 is sensed by the microswitch 96. The position of an article ready to receive a label is shown in FIG. 5A which shows article 100 aligned with the die 165. The applicator has been suitably loaded with a web roll 40, preprinted and coated with a release agent and an adhesive as has been described. The web roll 40 will be unrolled to dispense a continuous web 11.

When the applicator 10 is actuated, the optical sensor 180 will properly advance the web so that a selected area of the web is properly positioned with respect to the anvil plate 110 and die 165 as seen in FIG. 5A. Once registration is proper with the web interposed between the die 165 and anvil plate as seen in FIG. 5B, the actuator 170 will cause the clamping plate 150 to retract, bringing the die 165 into engagement with the web. The retraction of the clamping plate will sever the label in the shape determined by the edge 168 of the die, as seen in FIG. 5C. The transfer member 120 is then actuated in sequence and moves forward under the influence of the cylinder 128 and simultaneously a low vacuum is applied via conduit 134 to the cavity 135 within the transfer member. The transfer member removes the severed label from the web and continues to move outwardly as seen in FIG. 5D. The transfer member 120 continues to extend until the severed label contacts the surface of the container. At this point, the adhesive coating on the back surface of the removed label "L" will adhere to the surface of the container 100. The vacuum the cavity 135 is then released and member 120 retracts and the clamping plate and die move outwardly away from the anvil plate 110 to permit the web to advance a predetermined distance as established by the registration indicia as illustrated in FIG. 5E. The container 100 with the applied label is advanced on the conveyor and a new container is moved into position to initiate repetition of the operation.

Periodically the wiper 200 is actuated to prevent the adhesive on the labels from sticking to the die edge 168. Accordingly, motor 225 is energized causing the wiper arm 210 to move from the retracted position shown in FIG. 5F to the position shown in FIG. 5G. As the wiper moves from the retracted to the actuated position, the pad 230 passes across the surface of the die lightly engaging the die edges 168. The light engagement will cause a thin coating of lubricant such as silicon grease to be applied to the cutting edges. As mentioned above, the wiper arm moves through an arc of about 120° and upon actuation will return to the unactuated, out-of-the-way position so repetition of the labeling operation can occur. In the return position, the wiper pad 230 will engage the reservoir 250 to apply lubricant to the pad 230. Generally, it is not necessary for the wiper to be actuated after each label severing operation or cycle. The frequency will depend on the adhesive and thickness of the substrate and the cycle times can be adjusted as required by the operating conditions.

The wiper of the present invention cleans and lubricates only the die knife edge to prevent the adhesive coating on the labels from sticking to the die edge. The primary purpose of the wiper is not the removal of adhesive, but to eliminate sticking of the adhesive to the die. The wiper will also remove chaff and prevent residue from accumulating on the labels as they are applied.

Figure 6:
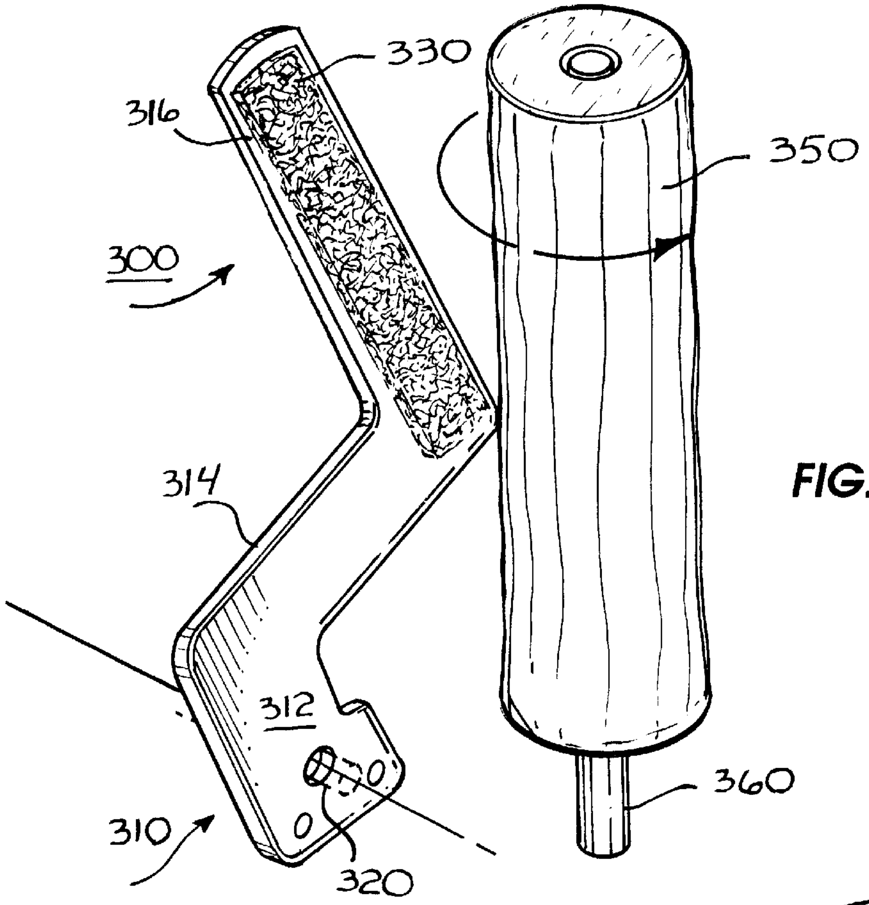
FIGS. 6 and 7 illustrate other embodiments of the wiper and lubricant reservoir.

FIG. 6 illustrates another form of the wiper and cleaner that may be used with the label applicator as described above. The wiper of FIG. 6 is designated by the numeral 300 and has a rotatable wiper arm 310 having an applicator pad at end 316. The inner end 312 is mounted for rotation on shaft 320 so the applicator end will in the actuated position pass across the face of the die and in the retracted position will contact reservoir 350. Reservoir 350 is a cylindrical member which has a fibrous or absorbent surface which receives a lubricant. The cylindrical member is preferably rotatable about shaft 360 so the entire outer surface serves as a reservoir and reduces localized wear.

Figure 7:
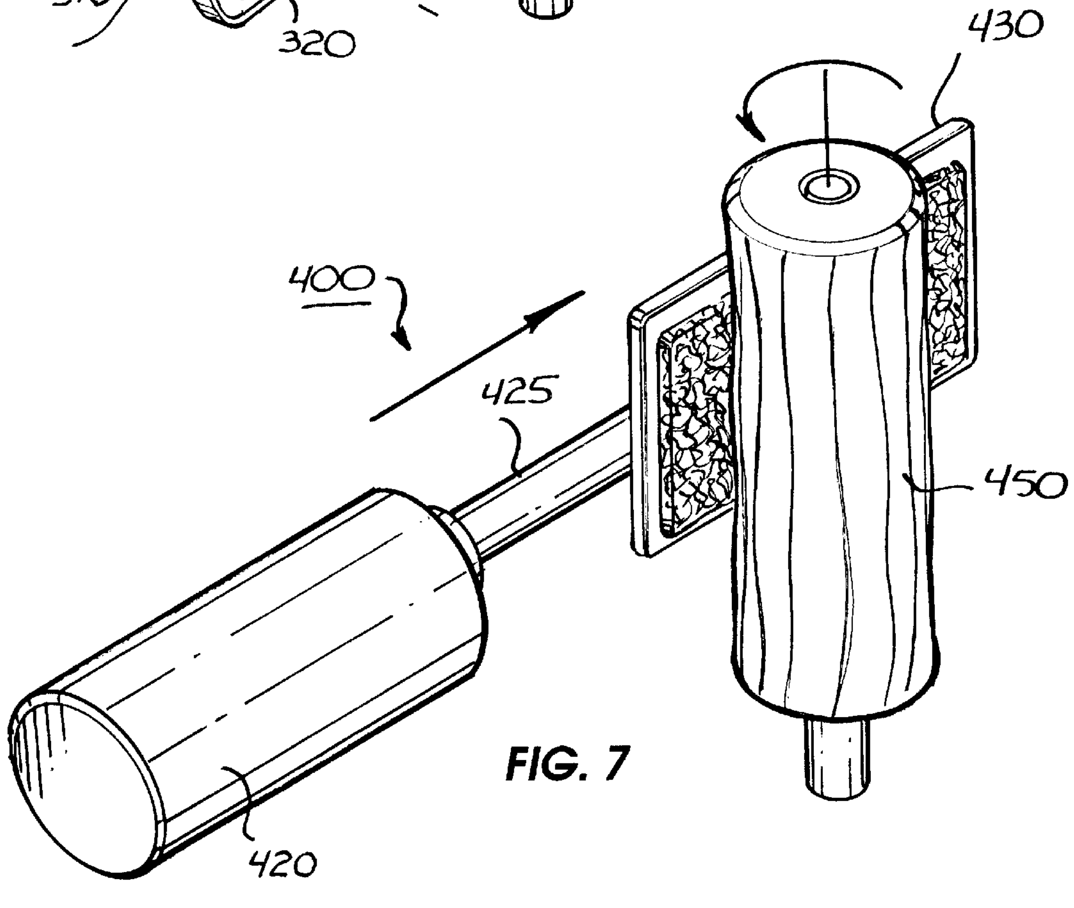

In FIG. 7, the wiper is designated by the numeral 400 and includes a pneumatic linear cylinder 420 with a reciprocating rod 425 to which is attached an applicator pad 430 which when extended lightly contacts the die face and when retracted contacts reservoir 450. Reservoir 450 is a cylindrical member with an absorbent lubricant filled surface.

Thus, it will be seen from the foregoing that the present invention provides a label applicator that has a substantial number of advantages. The linerless label applicator eliminates the need for expensive silicon coated release liners, printed paper stocks and plastic film laminates which are conventionally required to make durable labels. With the present invention, a single web is provided which is adhesive coated, pre-printed and provided with release lining so that it will be supplied to the user in roll form for convenient unwinding and use.

The applicator of the present invention allows use of thinner labels which makes recycling of the containers to which the labels are supplied more practical. The linerless label applicator of the present invention also permits the number of labels per roll to be increased, for example by two times, requiring less storage space and providing more efficient operation as the reloading time of the applicator is reduced.

Linerless labels as indicated may be made from various materials, preferably plastic films including newer plastic films which are more environmentally safe and also are biodegradable.

One significant advantage is that the steel rule dies are easily and quickly interchangeable and may be changed to cut labels of almost any shape from the adhesive coated web. The wiper assembly assists in preventing the labels from sticking to the die edge and wall and will also remove small particulate matter such as chaff.

It will be obvious to those skilled in the art to make various changes, alterations and modifications to the label system described herein. To the extent that these various alterations, modifications and changes do not depart from the spirit and scope of the appended claims, they are intended to be encompassed therein.

We claim:

1. A method of labeling an article comprising:

(a) providing a roll of a flexible substrate having opposite surfaces and having pre-printed images at predetermined intervals along the substrate, said substrate being at least partially coated on one surface with an adhesive;

(b) feeding the substrate from the roll to an application station at a predetermined feed rate;

(c) positioning the article to be labeled adjacent the application station;

(d) providing an interchangeable die at the application station having a surface defining a predetermined shape in the desired shape of the label to be applied to the article and which has an opening extending through the die;

(e) bringing the die into contact with the substrate generally normal to the substrate against an oppositely positioned generally planar anvil plate spaced a predetermined distance from said die by moving said die toward said anvil plate to sever a label of predetermined shape from said substrate;

(f) bringing a transfer member into contact with the severed label;

(g) extending the transfer member through the said openings in the die and anvil to bring the severed label into contact with the article with the adhesive surface of the label against the article;

(h) thereafter withdrawing the transfer member leaving the label affixed to the article and moving said die away from said anvil plate said predetermined distance; and (i) cleaning and lubricating the surface of the die to prevent sticking of the label by intermittently moving a substantially porous wiping pad from a retracted position in which the wiping pad is positioned adjacent said die and in contact with a lubricant containing porous media to receive lubricant to an actuated position in which the porous wiping pad moves across substantially the entire surface of the die, said pad being dimensioned to be accommodated within said predetermined distance between said anvil plate and die.

2. The method of claim 1 wherein said lubricant is a silicon-based lubricant.

3. An applicator apparatus for applying labels to articles which labels are provided on a web which is moved sequentially past an application station comprising:

(a) feeding means for feeding a web having opposite surfaces and having labels repetitively printed on a surface thereof and having an adhesive on the other surface thereof;

(b) a die having a cutting edge of a predetermined shape and defining an opening therethrough, said die being mounted on a clamping plate;

(c) an anvil plate having a generally planar surface positioned adjacent said die a spaced distance therefrom and defining an opening receiving a retractable and an extendable transfer member aligned with said opening;

(d) means for selectively moving said die and anvil plate into contact generally normal to the web to sever a selected label from said web;

(e) transfer means;

(f) sensing means for advancing said web at an intermittent predetermined rate whereby once a label is severed, said label is transferred to the surface of an article by said transfer member;

(g) means for releasing said label when said label is applied to the article;

(h) a lubricant reservoir having a porous surface;

(i) generally planar wiper means having a substantially planar wiper blade with a porous wiping pad as the surface and dimensioned to be received in said spaced distance; and (j) actuator means associated with said wiper means intermittently actuable to move said wiper blade to an actuated position passing substantially across said die from a position adjacent the die and anvil and to return said wiper to a non-actuated position contacting said lubricant reservoir to transfer lubricant to said wiper blade.

4. The apparatus of claim 3 wherein said actuator means is an electric motor.

5. The apparatus of claim 3 wherein said actuator means is a hydraulic motor.

6. The apparatus of claim 3 wherein said actuator means is a linear device.

7. The apparatus of claim 3 wherein said actuator means is a rotary device.

8. The apparatus of claim 3 wherein said blade has an absorbent surface.

9. The apparatus of claim 3 wherein said reservoir is a generally cylindrical member leaving an absorbent surface.

10. The apparatus of claim 3 wherein said actuator means is a linear cylinder and said reservoir is a generally cylindrical member.

* * * * *